United States Patent
Saruwatari et al.

(10) Patent No.: US 11,482,700 B2
(45) Date of Patent: Oct. 25, 2022

(54) POSITIVE ELECTRODE ACTIVE MATERIAL FOR NONAQUEOUS ELECTROLYTE SECONDARY BATTERIES AND METHOD FOR PRODUCING POSITIVE ELECTRODE ACTIVE MATERIAL FOR NONAQUEOUS ELECTROLYTE SECONDARY BATTERIES

(71) Applicant: SUMITOMO METAL MINING CO., LTD., Tokyo (JP)

(72) Inventors: Motoaki Saruwatari, Niihama (JP); Hiroko Oshita, Niihama (JP); Kazuomi Ryoshi, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 431 days.

(21) Appl. No.: 16/318,940

(22) PCT Filed: Jul. 31, 2017

(86) PCT No.: PCT/JP2017/027742
§ 371 (c)(1),
(2) Date: Jan. 18, 2019

(87) PCT Pub. No.: WO2018/030199
PCT Pub. Date: Feb. 15, 2018

(65) Prior Publication Data
US 2019/0198872 A1    Jun. 27, 2019

(30) Foreign Application Priority Data

Aug. 9, 2016 (JP) ............... JP2016-156064
Oct. 12, 2016 (JP) ............... JP2016-201324

(51) Int. Cl.
*H01M 4/485* (2010.01)
*H01M 4/525* (2010.01)
(Continued)

(52) U.S. Cl.
CPC ............ *H01M 4/485* (2013.01); *C01G 53/50* (2013.01); *H01M 4/0419* (2013.01);
(Continued)

(58) Field of Classification Search
CPC .... H01M 4/0419; H01M 4/0471; H01M 4/36; H01M 4/485; H01M 4/505; H01M 4/525;
(Continued)

(56) References Cited

U.S. PATENT DOCUMENTS 6,730,435 B1   5/2004   Nakane et al.
8,187,747 B2   5/2012   Abe et al.
(Continued)

FOREIGN PATENT DOCUMENTS

CN    1294417    5/2001
JP    H04-300153    10/1992
(Continued)

OTHER PUBLICATIONS

International Search Report dated Sep. 26, 2017 with respect to PCT/JP2017/027742.

*Primary Examiner* — Stewart A Fraser
*Assistant Examiner* — Lilia Nedialkova
(74) *Attorney, Agent, or Firm* — IPUSA, PLLC

(57) ABSTRACT

A positive electrode active material for a nonaqueous electrolyte secondary battery includes a lithium-nickel-cobalt-zinc composite oxide powder that contains lithium (Li); nickel (Ni); cobalt (Co); element M, which is at least one element selected from the group consisting of manganese (Mn), vanadium (V), magnesium (Mg), molybdenum (Mo), niobium (Nb), silicon (Si), titanium (Ti), and aluminum (Al); and zinc (Zn). A molar element ratio (Li:Ni:Co:M) of the lithium-nickel-cobalt-zinc composite oxide powder satisfies Li:Ni:Co:M=z:(1-x-y):x:y (where $0.95 \leq z \leq 1.10$, $0.05 \leq x \leq 0.35$, and $0 \leq y \leq 0.10$); a zinc content with respect to (Continued)

Li, Ni, Co, the element M, and oxygen in the lithium-nickel-cobalt-zinc composite oxide powder is greater than or equal to 0.01 mass % and less than or equal to 1.5 mass %; and at least a part of a surface of the lithium-nickel-cobalt-zinc composite oxide powder includes a zinc solid-solved region where zinc is solid-solved.

10 Claims, 3 Drawing Sheets

(51) Int. Cl.
H01M 4/36 (2006.01)
H01M 4/505 (2010.01)
C01G 53/00 (2006.01)
H01M 4/04 (2006.01)
H01M 10/0525 (2010.01)
H01M 4/02 (2006.01)

(52) U.S. Cl.
CPC ........... H01M 4/0471 (2013.01); H01M 4/36 (2013.01); H01M 4/505 (2013.01); H01M 4/525 (2013.01); C01P 2002/52 (2013.01); C01P 2004/61 (2013.01); C01P 2004/84 (2013.01); C01P 2006/12 (2013.01); H01M 10/0525 (2013.01); H01M 2004/028 (2013.01)

(58) Field of Classification Search
CPC ........ H01M 2004/028; H01M 10/0525; Y02E 60/10; C01P 2004/61; C01P 2004/84; C01P 2002/52; C01G 53/50
See application file for complete search history.

(56) References Cited

U.S. PATENT DOCUMENTS

| 10,056,610 | B2 | 8/2018 | Nakayama et al. |
| 2005/0058588 | A1* | 3/2005 | Kang ................. C01G 51/50 |
| | | | 423/420.2 |
| 2015/0194662 | A1 | 7/2015 | Yang et al. |
| 2018/0331358 | A1 | 11/2018 | Yamaji et al. |

FOREIGN PATENT DOCUMENTS

| JP | 2006-073482 | 3/2006 |
| JP | 2007-273108 | 10/2007 |
| JP | 2010-086922 | 4/2010 |
| JP | 2011-129258 | 6/2011 |
| JP | 2013-206553 | 10/2013 |
| JP | 2015-130340 | 7/2015 |
| JP | 2015-144108 | 8/2015 |
| JP | 2016-100060 | 5/2016 |
| WO | 2006/027925 | 3/2006 |
| WO | 2014/189108 | 11/2014 |

* cited by examiner

POSITIVE ELECTRODE ACTIVE MATERIAL FOR NONAQUEOUS ELECTROLYTE SECONDARY BATTERIES AND METHOD FOR PRODUCING POSITIVE ELECTRODE ACTIVE MATERIAL FOR NONAQUEOUS ELECTROLYTE SECONDARY BATTERIES

TECHNICAL FIELD

The present invention relates to a positive electrode active material for nonaqueous electrolyte secondary batteries and a method for producing a positive electrode active material for nonaqueous electrolyte secondary batteries.

BACKGROUND ART

In recent years, with the widespread use of portable electronic devices, such as mobile phones and notebook computers, there is a high demand for the development of small and light nonaqueous electrolyte secondary batteries having high energy density. There is also a high demand for the development of high-output secondary batteries as batteries for electric vehicles such as hybrid electric vehicles. Lithium ion batteries are nonaqueous secondary batteries that can satisfy these demands. A lithium ion secondary battery includes a negative electrode, a positive electrode, an electrolyte solution, and the like. Materials capable of sustaining lithium insertion and deinsertion are used as a negative-electrode active material and a positive electrode active material.

Lithium ion batteries are currently the subject of substantial research and development. In particular, lithium ion secondary batteries using a layered or spinel type lithium metal composite oxide as a positive electrode material can achieve a high voltage of around 4V and is therefore being developed for practical applications as a battery having high energy density. Various materials have been proposed for use as the positive-electrode material of such lithium ion secondary batteries. For example, lithium-cobalt composite oxide ($LiCoO_2$), which is relatively easy to synthesize; lithium-nickel composite oxide ($LiNiO_2$) using nickel as a cheaper alternative to cobalt; lithium-nickel-cobalt-manganese composite oxide ($LiNi_{1/3}Co_{1/3}Mn_{1/3}O_2$); lithium-manganese composite oxide ($LiMn_2O_4$) using manganese and the like have been proposed.

In particular, numerous efforts have been made to develop lithium ion secondary batteries using lithium-cobalt composite oxides with improved initial capacity characteristics and cycle characteristics, and various positive outcomes have been obtained therefrom. However, because an expensive cobalt compound is used as a raw material in a lithium-cobalt composite oxide, the cost per capacity of batteries using lithium-cobalt composite oxides is substantially higher than nickel-hydrogen batteries, and as such, their applications are substantially limited. Thus, the development of techniques for reducing the cost of the positive electrode active material to enable production of a more inexpensive lithium ion secondary battery is desires so that the positive electrode active material can be used in both small secondary batteries for portable devices as well as large secondary batteries for electric power storage and electric vehicles.

An example of a potential new material to be used as the positive electrode active material of a lithium ion secondary battery includes a lithium-nickel composite oxide that uses nickel, which is a cheaper alternative to cobalt. The lithium-nickel composite oxide exhibits a lower electrochemical potential as compared with the lithium-cobalt composite oxide, and as such, the lithium-nickel composite oxide may be less prone to problems of decomposition due to oxidation of the electrolyte, achieve higher capacity, and exhibit a high battery voltage comparable to that of the cobalt-based lithium ion secondary battery. As such, active research and development efforts are being made with respect to the lithium-nickel composite oxide. However, when a purely nickel-based lithium composite oxide synthesized with only nickel is used as the positive electrode active material of a lithium ion secondary battery, cycle characteristics may be degraded as compared with cobalt-based lithium ion secondary batteries. Also, such a purely-nickel-based lithium ion secondary battery may be prone to battery performance degradation when stored or used in a high temperature environment. In this respect, lithium-nickel composite oxides obtained by substituting a part of nickel with cobalt or aluminum are generally known (see e.g., Patent Document 1).

A generally known method for producing a positive electrode active material involves preparing a nickel composite hydroxide as a precursor using the so-called neutralization crystallization method, and mixing the precursor with a lithium compound such as lithium hydroxide and firing the mixture to obtain a lithium-nickel composite oxide. The lithium-nickel composite oxide synthesized in the above-described manner has unreacted lithium hydroxide remaining therein. The unreacted lithium hydroxide may cause gelation when kneading the positive electrode active material into a paste. Further, when the positive electrode active material is charged under a high temperature environment, the lithium hydroxide may undergo oxidization and decomposition to thereby cause the generation of gas.

In this respect, Patent Document 2 describes a method that involves washing the lithium-nickel composite oxide with water after its synthesis to remove impurities from the surfaces of primary particles of the lithium-nickel composite oxide. However, when washing the lithium-nickel composite oxide with water, not only are the impurities removed but lithium within the lattices of the lithium-nickel composite oxide is also extracted such that lithium ion deficiency occurs at the crystals on the active material surface due to excessive elution of lithium compounds. Thus, the positive electrode active material obtained by the above-described method may sustain a decrease in battery capacity and an increase in battery resistance.

In this respect, Patent Document 3 describes a method that involves adding pure water to the lithium-nickel composite oxide that has been synthesized to form a slurry, stirring the slurry to remove impurities, and then subjecting the slurry to a heat treatment in an oxygen atmosphere having an oxygen concentration of at least 80% by volume, at a temperature greater than or equal to 120° C. and less than or equal to 550° C. Because the loss of lithium from the surfaces of lithium-nickel composite oxide particles during the washing process is compensated for by lithium from the interior of the particles by the heat treatment, a lithium deficiency may be prevented from occurring at the surface of the positive electrode active material obtained by the above-described method the positive electrode resistance of the battery may be reduced. Although the amount of lithium supplemented from the interior of the positive electrode active material particles to the particle surface is relatively small, there is room for improvement in terms of solving the lithium deficiency in the entire particle, and techniques for further increasing the battery capacity and decreasing electrical resistance are desired.

Further, in both Patent Documents 2 and 3, atmospheric degradation is a problem particularly with respect to a lithium-nickel composite oxide having a high battery capacity and a high nickel ratio. That is, moisture in the atmosphere may react with the surface of the lithium-nickel composite oxide to cause lithium extraction from the crystal interior that results in atmospheric degradation, which in turn causes a decrease in battery capacity and an increase in reaction resistance.

PRIOR ART DOCUMENTS

Patent Documents

Patent Document 1: Japanese Unexamined Patent Publication No. H04-300153
Patent Document 2: Japanese Unexamined Patent Publication No. 2007-273108
Patent Document 3: International Publication No. WO/2014/189108

SUMMARY OF THE INVENTION

Problem to be Solved by the Invention

In view of the foregoing problems in the related art, one aspect of the present invention is directed to providing a positive electrode active material for a nonaqueous electrolyte secondary battery that has high discharge capacity and is capable of maintaining low reaction resistance even when exposed to the atmosphere.

Means for Solving the Problem

According to one embodiment of the present invention, a positive electrode active material for a nonaqueous electrolyte secondary battery is provided that includes a lithium-nickel-cobalt-zinc composite oxide powder containing lithium (Li); nickel (Ni); cobalt (Co); an element M, which is at least one element selected from the group consisting of manganese (Mn), vanadium (V), magnesium (Mg), molybdenum (Mo), niobium (Nb), silicon (Si), titanium (Ti), and aluminum (Al); and zinc (Zn). A molar element ratio (Li:Ni:Co:M) of the lithium-nickel-cobalt-zinc composite oxide powder satisfies Li:Ni:Co:M=z:(1-x-y):x:y (where $0.95 \leq z \leq 1.10$, $0.05 \leq x \leq 0.35$, and $0 \leq y \leq 0.10$). A zinc content with respect to Li, Ni, Co, the element M, and oxygen in the lithium-nickel-cobalt-zinc composite oxide powder is greater than or equal to 0.01 mass % and less than or equal to 1.5 mass %. At least a part of a surface of the lithium-nickel-cobalt-zinc composite oxide powder includes a zinc solid-solved region where zinc is solid-solved.

Advantageous Effect of the Invention

According to an aspect of the present invention, a positive electrode active material for a nonaqueous electrolyte secondary battery that has high discharge capacity and is capable of maintaining low reaction resistance even when exposed to the atmosphere may be provided.

EMBODIMENTS FOR IMPLEMENTING THE INVENTION

Figure 1:
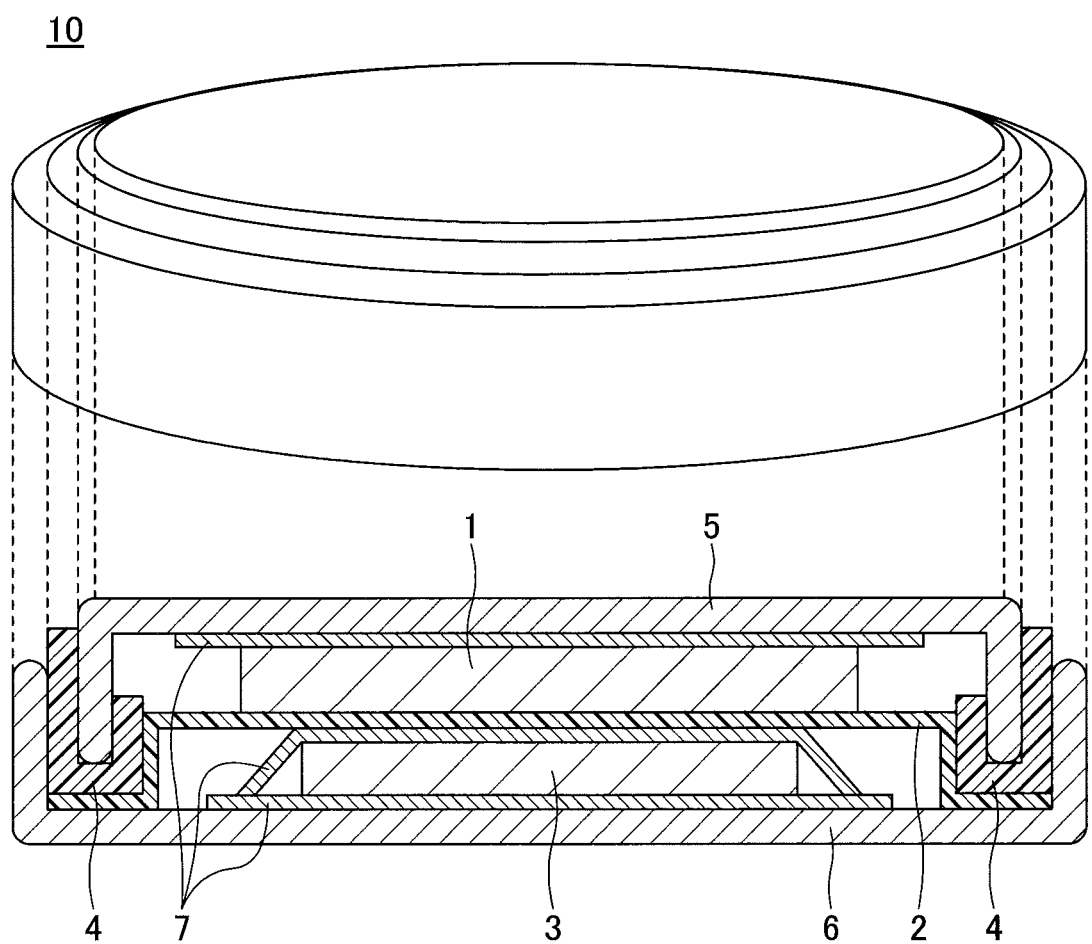
FIG. 1 is a schematic cross-sectional view of a coin-type battery used for battery evaluation.

In order to solve the foregoing problems, the inventors of the present invention conducted extensive research on a lithium-nickel-cobalt composite oxide powder used as a positive electrode active material for a nonaqueous electrolyte secondary battery and a method for producing the same. As a result, the inventors have found that a positive electrode active material that has high discharge capacity and is capable of maintaining low reaction resistance even when exposed to the atmosphere can be produced by forming a zinc solid-solved region where zinc is solid-solved on the surface of the lithium-nickel-cobalt composite oxide powder, and in this way, the inventors have conceived the present invention.

In the following, embodiments of the present invention will be described. Specifically, first, an example configuration of a method for producing a positive electrode active material for a nonaqueous electrolyte secondary battery according to an embodiment of the present invention will be described. Then, a positive electrode active material for a nonaqueous electrolyte secondary battery according to an embodiment of the present invention, and an example configuration of a nonaqueous electrolyte secondary battery using the above positive electrode active material will be described. Note that the present invention is not limited by the following detailed description unless otherwise specified. Embodiments according to the present invention will be described in the following order.

1. Method for producing positive electrode active material for nonaqueous electrolyte secondary battery
2. Positive electrode active material for nonaqueous electrolyte secondary battery
3. Nonaqueous electrolyte secondary battery 1. Method for Producing Positive Electrode Active Material A method for producing a positive electrode active material for a nonaqueous electrolyte secondary battery according to the present embodiment may include:

a coating step of coating a surface of a lithium-nickel-cobalt composite oxide powder with a compound containing zinc, where the lithium-nickel-cobalt composite oxide powder contains lithium (Li); nickel (Ni); cobalt (Co); and an element M, which is at least one element selected from the group consisting of manganese (Mn), vanadium (V), magnesium (Mg), molybdenum (Mo), niobium (Nb), silicon (Si), titanium (Ti), and aluminum (Al); and a molar element ratio (Li:Ni:Co:M) of the lithium-nickel-cobalt composite oxide powder satisfies Li:Ni:Co:M=z:(1-x-y):x:y (where $0.95 \leq z \leq 1.10$, $0.05 \leq x \leq 0.35$, and $0 \leq y \leq 0.10$); and a heat treatment step of performing a heat treatment on the lithium-nickel-cobalt composite oxide powder coated with the compound containing zinc. Features of the above steps will be described in detail below.

Note that the method for producing a positive electrode active material for a nonaqueous electrolyte secondary battery according to the present embodiment may be used to produce a positive electrode active material for a nonaqueous electrolyte secondary battery according to the present embodiment (described below), for example. As such, in the following descriptions of the method for producing a positive electrode active material and the positive electrode active material according to the present embodiment, overlapping explanations may be omitted as appropriate.

[Coating Step]

In the coating step, the surface of the lithium-nickel-cobalt composite oxide powder may be coated with a compound containing zinc.

In the coating step, the method of coating a compound containing zinc on the lithium-nickel-cobalt composite oxide powder, more specifically, the surface of each lithium-nickel-cobalt composite oxide particle constituting the powder, is not particularly limited.

For example, the surface of the lithium-nickel-cobalt composite oxide powder may be coated using any of the following methods.

A method of coating the surface of the lithium-nickel-cobalt composite oxide powder with a compound containing zinc in the coating step may involve mixing together the lithium-nickel-cobalt composite oxide powder, pure water or an alkaline aqueous solution, and an aqueous solution containing zinc (crystallization/immersion method).

A method of coating the surface of the lithium-nickel-cobalt composite oxide powder with a compound containing zinc in the coating step may involve spraying an aqueous solution containing zinc onto the lithium-nickel-cobalt composite oxide powder (spraying method).

A method of coating the surface of the lithium-nickel-cobalt composite oxide powder with a compound containing zinc in the coating step may involve mixing together the lithium-nickel-cobalt composite oxide powder and a powder of the compound containing zinc (powder mixing method).

Note that the surface of the lithium-nickel-cobalt composite oxide powder can be coated with a compound containing zinc using any of the above-described methods. However, the crystallization/immersion method may preferably be used in view of the ability to uniformly add and coat the compound containing zinc onto the surface of the lithium-nickel-cobalt composite oxide powder, the ability to simultaneously remove excess lithium compound components on the surface of the lithium-nickel-cobalt composite oxide powder, and the high yield of the added compound containing zinc.

In the following, each of the above methods will be specifically described.

(1) Crystallization/Immersion Method

As described above, the crystallization/immersion method involves mixing together the lithium-nickel-cobalt composite oxide powder, pure water or an alkaline aqueous solution, and an aqueous solution containing zinc, such as an aqueous solution of a salt containing zinc or a complex containing zinc, for example. In this way, the surface of the lithium-nickel-cobalt composite oxide powder can be coated with a compound containing zinc.

Note that when mixing together the lithium-nickel-cobalt composite oxide powder, pure water or an alkaline aqueous solution, and an aqueous solution containing zinc, the pH and the liquid temperature of the mixed solution may be adjusted to cause precipitation of the compound containing zinc on the surface of the lithium-nickel-cobalt composite oxide powder. A coating method that involves causing precipitation of the compound containing zinc as described above may be referred to as crystallization method, and a coating method that simply involves coating the surface of the lithium-nickel-cobalt composite oxide powder with the compound containing zinc without causing precipitation of the compound containing zinc may be referred to as immersion method. In this way the two coating methods may be distinguished.

Note that the type of compound containing zinc used for coating the surface of the lithium-nickel-cobalt composite oxide powder is not particularly limited, but the compound containing zinc is preferably at least one substance selected from zinc hydroxide and zinc oxide. In the case where the compound containing zinc is precipitated using the crystallization method as described above, the precipitated compound containing zinc is also preferably at least one substance selected from zinc hydroxide and zinc oxide.

The alkaline aqueous solution to be used is not particularly limited, but for example, an aqueous solution containing at least one substance selected from sodium hydroxide, potassium hydroxide, lithium hydroxide, ammonia and the like may be used. When reduction of impurities is particularly required, an aqueous solution containing at least one substance selected from lithium hydroxide and ammonia is preferably used.

As for the aqueous solution containing zinc, for example, an aqueous solution of a salt containing zinc or a complex containing zinc may be used as described above. The salt containing zinc or the complex containing zinc is not particularly limited, but the salt containing zinc is preferably a water-soluble salt, and the complex containing zinc is preferably a zinc compound forming a complex in an alkaline aqueous solution. For example, at least one substance selected from zinc hydroxide, zinc oxide, zinc sulfate, zinc chloride, zinc nitrate, zinc acetate and the like may be used as the salt containing zinc or the complex containing zinc.

When the crystallization/immersion method is used in the coating step, the concentration of the lithium-nickel-cobalt composite oxide powder in the suspension is preferably arranged to be greater than or equal to 200 g/L and less than or equal to 2500 g/L. This is because although the amount of particles in the suspension can be increased by increasing the concentration of the lithium-nickel-cobalt composite oxide powder, when the concentration exceeds 2500 g/L, the viscosity of the suspension becomes very high and stirring of the suspension may become difficult. In the crystallization/immersion method, by mixing together a lithium-nickel-cobalt composite oxide powder, pure water or an alkaline aqueous solution, and an aqueous solution containing zinc to form a suspension, effects similar to those obtained by a washing step (described below) can be obtained. However, when the concentration of the lithium-nickel-cobalt composite oxide powder in the suspension is less than 200 g/L, the effect of preventing extraction of lithium from within the lattice of the lithium-nickel-cobalt composite oxide may be compromised and the desired preventive effect may not be obtained. Note that more preferably, the concentration is arranged to be greater than or equal to 500 g/L and less than or equal to 2000 g/L.

The lithium-nickel-cobalt composite oxide powder coated with the compound containing zinc can be separated from the suspension and subjected to a heat treatment step or the like as described below.

The method of separating the lithium-nickel-cobalt composite oxide powder coated with the compound containing zinc from the suspension is not particularly limited, but for example, the lithium-nickel-cobalt composite oxide powder coated with the compound containing zinc can be separated by filtration. The filtration apparatus used for filtering is not particularly limited, and various filtration apparatuses that are conventionally used may be used. Specifically, for example, one or more types of apparatuses selected from a suction filter, a filter press, a centrifuge (centrifugal filter) or the like may be used. Note that after solid-liquid separation of the above-described suspension using a filtration apparatus, the amount of water that remains adhered to the particle surface is preferably small. This is because when a large amount of water is adhered to the particle surface, lithium dissolved in the liquid may reprecipitate to thereby cause gelation.

After the filtration step, a step of drying the lithium-nickel-cobalt composite oxide powder coated with the compound containing zinc (drying step) may also be performed. Note that the drying step will be described below. Alternatively, the lithium-nickel-cobalt composite oxide powder coated with the compound containing zinc that has been separated by the filtration step may be subjected to a heat treatment step (described below) without undergoing the drying step.

(2) Spraying Method

As described above, in the spraying method, an aqueous solution containing zinc, such as an aqueous solution of a salt containing zinc or a complex containing zinc, for example, is sprayed onto the lithium-nickel-cobalt composite oxide powder. In this way, the surface of the lithium-nickel-cobalt composite oxide powder may be coated with a compound containing zinc.

As descried above, for example, an aqueous solution of a salt containing zinc or a complex containing zinc may be used as the aqueous solution containing zinc. The salt containing zinc or the complex containing zinc is not particularly limited, but for example, the same substances as the example substances mentioned above in the description of the crystallization/immersion method may be used.

When the spraying method is used in the coating step, the lithium-nickel-cobalt composite oxide powder is preferably dried in advance before being subjected to the coating step. In the case of drying the lithium-nickel-cobalt composite oxide powder, drying is preferably performed under the same conditions as those used in the drying step as described below.

(3) Powder Mixing Method

As described above, in the case of using the powder mixing method in the coating step, a lithium-nickel-cobalt composite oxide powder and a powder of a compound containing zinc are mixed together so that the powder of the compound containing zinc is adhered to the surface of the lithium-nickel-cobalt composite oxide powder. In this way, the surface of the lithium-nickel-cobalt composite oxide powder may be coated with the compound containing zinc.

The powder of the compound containing zinc used in the powder mixing method is not particularly limited, but for example, one or more substances selected from zinc hydroxide, zinc oxide, zinc sulfate, zinc chloride, zinc nitrate, zinc acetate and the like may be used.

When the powder mixing method is used in the coating step, the lithium-nickel-cobalt composite oxide powder is preferably dried in advance before being subjected to the coating step.

Note that the means used for mixing the lithium-nickel-cobalt composite oxide powder and the powder of the compound containing zinc is not particularly limited as long as the two powders can be mixed together.

In the coating step, the amount of coating is preferably adjusted so that the zinc content in the lithium-nickel-cobalt-zinc composite oxide powder to be obtained after the heat treatment step (described below) will be within a suitable range. A suitable content of zinc in the lithium-nickel-cobalt-zinc composite oxide powder will be described below in connection with the positive electrode active material for a nonaqueous electrolyte secondary battery.

Also, the method used to prepare the lithium-nickel-cobalt composite oxide powder to be subjected to the coating step is not particularly limited, and any known method may be used to prepare the lithium-nickel-cobalt composite oxide powder. Specifically, for example, the lithium-nickel-cobalt composite oxide powder may be prepared by mixing together a nickel cobalt composite oxide, corresponding to a precursor produced by a crystallization method or the like, and a lithium compound, and firing the mixture.

[Heat Treatment Step]

By performing a heat treatment on the lithium-nickel-cobalt composite oxide powder coated with the compound containing zinc obtained by the coating step, the zinc contained in the coating of the compound containing zinc may dissolve into the surface of the lithium-nickel-cobalt composite oxide powder, more specifically the surface of each lithium-nickel-cobalt composite oxide particle constituting the powder. In this way, a zinc solid-solved region where zinc is solid-solved may be formed on at least a part of the surface of the lithium-nickel-cobalt composite oxide powder (particles).

The heat treatment temperature in the heat treatment step is not particularly limited, but the heat treatment temperature is preferably greater than or equal to 170° C. and less than or equal to 700° C. This is because by arranging the heat treatment temperature to be greater than or equal to 170° C., zinc can adequately dissolve into the surface of the lithium-nickel-cobalt composite oxide powder. However, when the heat treatment temperature exceeds 700° C., cation mixing of the lithium-nickel-cobalt composite oxide may occur due to the heat, and good battery characteristics may not be obtained. As such, the heat treatment temperature is preferably arranged to be less than or equal to 700° C.

Also, the heat treatment time of the heat treatment step is preferably arranged to be greater than or equal to 1 hour and less than or equal to 10 hours. This is because by arranging the heat treatment time to be greater than or equal to 1 hour, zinc can adequately dissolve into the surface of the lithium-nickel-cobalt composite oxide powder. By arranging the heat treatment time to be less than or equal to 10 hours, diffusion of zinc into the interior of the lithium-nickel-cobalt composite oxide powder may be prevented and the zinc solid-solved region may be more reliably localized to the surface of the powder.

The atmosphere in which the heat treatment step is performed is not particularly limited, but for example, an oxygen atmosphere is preferably used.

Note that the method for producing the positive electrode active material for a nonaqueous electrolyte secondary battery according to the present embodiment may also include some other process step in addition to the coating step and the heat treatment step as described above.

For example, a drying step and/or a washing step as described below may be performed.

[Drying Step]

In the case of performing a drying step, the drying step may be performed before the heat treatment step. Specifically, for example, before the heat treatment step, a drying step of drying the lithium-nickel-cobalt composite oxide powder coated with the compound containing zinc may be performed.

Further, in the case of performing a washing step (described below), the drying step may be performed between the washing step and the coating step, for example.

In the case of performing a drying step, the drying temperature is not particularly limited, but for example, the drying temperature may be arranged to be greater than or equal to 80° C. and less than or equal to 350° C. This is because when the drying temperature is less than 80° C., drying of the powder to be dried such as the lithium-nickel-cobalt composite oxide powder coated with the compound containing zinc or the lithium-nickel-cobalt composite oxide powder may be delayed, and a lithium concentration gradient may occur between the surface and the interior of the particles constituting the powder to be dried to thereby degrade battery characteristics. On the other hand, the amount of lithium near the surface of the powder to be dried is expected to be very close to the stoichiometric ratio or close to a charged state in which lithium is slightly desorbed, and as such, when the drying temperature exceeds 350° C., destruction of the crystal structure close to the charged state may be triggered. As such, when a positive electrode active material for a nonaqueous electrolyte secondary battery is prepared from a resulting dried powder, the battery characteristics of a battery using the positive electrode active material for the nonaqueous electrolyte secondary battery may be degraded.

The drying time of the drying step is not particularly limited, but for example, the drying time is preferably set up so that the moisture content of the resulting dried powder would be less than or equal to 0.2 mass %, more preferably less than or equal to 0.1 mass %, and more preferably less than or equal to 0.05 mass %.

The drying atmosphere for performing the drying step is preferably a gas atmosphere that is free of carbon and sulfur compound components or a vacuum atmosphere. This is because when the powder is dried under an atmosphere containing carbon and sulfur compound components, the amount of carbon and sulfur in the powder to be dried may change such that desired effects may not be obtained. Note, however, that carbon and sulfur may be contained in the drying atmosphere in small amounts as impurities, for example, to the extent that they do not affect the characteristics of the positive electrode active material prepared from the dried powder.

The drying step is preferably performed, for example, when the crystallization/immersion method or the spraying method is used in the coating step and the resulting lithium-nickel-cobalt composite oxide powder coated with a compound containing zinc includes liquid. In this respect, the drying step is preferably performed between the coating step and the heat treatment step.

[Washing Step]

Unreacted lithium in the form of a lithium compound may exist on the surfaces of the particles constituting the lithium-nickel-cobalt composite oxide powder. Due to the existence of such lithium compound, when a positive electrode active material mixture paste is prepared using a positive electrode active material produced from such lithium-nickel-cobalt composite oxide powder, gelation of the paste may occur. Thus, the unreacted lithium compound is preferably removed in advance by performing a washing step.

The washing step can be performed in pure water or in an alkaline aqueous solution. Preferably, the washing step is performed in an alkaline aqueous solution, such as an aqueous lithium hydroxide solution or aqueous ammonia, for example. This is because in the case where pure water is used, lithium may be desorbed not only from the unreacted lithium compound but also from particles constituting the lithium-nickel-cobalt composite oxide powder. On the other hand, when an alkaline aqueous solution is used, the unreacted lithium compound can be selectively removed, and desorption of lithium from the particles constituting the lithium-nickel-cobalt composite oxide powder can be prevented. However, when an alkaline aqueous solution other than lithium hydroxide or aqueous ammonia is used, the cations contained in the alkaline aqueous solution may remain as impurities. On the other hand, when an aqueous lithium hydroxide solution of aqueous ammonia is used as the alkaline aqueous solution in the washing step, the cations contained in the alkaline aqueous solution will be unlikely to remain as impurities.

Note that in the washing step as well as other process steps, when water is used as an aqueous solution or the like, the water used is preferably pure water. The electrical conductivity of the pure water is preferably less than or equal to 10 μS/cm, and more preferably less than or equal to 1 μS/cm.

In the case of performing the washing step, the washing step may be performed before the coating step, for example. In the case of using the crystallization/immersion method or the spraying method in the coating step, the washing step may also be performed during the coating step, for example.

2. Positive Electrode Active Material

A positive electrode active material for a nonaqueous electrolyte secondary battery according to the present embodiment includes a lithium-nickel-cobalt-zinc composite oxide powder that contains lithium (Li); nickel (Ni); cobalt (Co); element M, which is at least one element selected from the group consisting of manganese (Mn), vanadium (V), magnesium (Mg), molybdenum (Mo), niobium (Nb), silicon (Si), titanium (Ti), and aluminum (Al); and zinc (Zn).

The molar element ratio (Li:Ni:Co:M) of the lithium-nickel-cobalt-zinc composite oxide powder satisfies Li:Ni:Co:M=z:(1-x-y):x:y (where $0.95 \leq z \leq 1.10$, $0.05 \leq x \leq 0.35$, and $0 \leq y \leq 0.10$).

The zinc content with respect to Li, Ni, Co, element M, and oxygen in the lithium-nickel-cobalt-zinc composite oxide powder is greater than or equal to 0.01 mass % and less than or equal to 1.5 mass %.

At least a part of the surface of the lithium-nickel-cobalt-zinc composite oxide powder includes a zinc solid-solved region where zinc is solid-solved.

In the following, each of the above features will be described in detail.

[Composition]

As described above, the positive electrode active material for a nonaqueous electrolyte secondary battery according to the present embodiment (hereinafter also simply referred to as "positive electrode active material") may include a lithium-nickel-cobalt-zinc composite oxide powder and may consist of the lithium-nickel-cobalt-zinc composite oxide powder.

The lithium-nickel-cobalt-zinc composite oxide powder included in the positive electrode active material preferably contains lithium at an atomic ratio z, where $0.95 \leq z \leq 1.10$. This is because when the atomic ratio z of lithium is less than 0.95, the positive electrode reaction resistance in the nonaqueous electrolyte secondary battery using the positive electrode active material increases such that the battery output decreases. On the other hand, by arranging the atomic ratio z of lithium to be greater than or equal to 0.95, the positive electrode reaction resistance in the nonaqueous electrolyte secondary battery using the positive electrode active material can be decreased and the battery output can be increased. Although the charge-discharge capacity can be increased by increasing the atomic ratio z, when the atomic ratio z exceeds 1.10, safety may be compromised. Thus, by arranging the atomic ratio z to be less than or equal to 1.10, safety can be enhanced. In view of the above, the atomic ratio z of lithium is preferably $0.95 \leq z \leq 1.10$, and more preferably $0.97 \leq z \leq 1.05$.

By including cobalt in the lithium-nickel-cobalt-zinc composite oxide powder included in the positive electrode active material, good cycle characteristics can be obtained. This is because by replacing a part of nickel in the crystal lattice with cobalt, the expansion/contraction behavior of the crystal lattice due to the insertion/deinsertion of lithium upon electrical charge/discharge may be reduced.

Also, by including a predetermined amount of nickel in the lithium-nickel-cobalt-zinc composite oxide powder included in the positive electrode active material a high charge/discharge capacity may be achieved.

The atomic ratio of cobalt in the lithium-nickel-cobalt-zinc composite oxide powder is preferably $0.05 \leq x \leq 0.35$, and more preferably $0.10 \leq x \leq 0.20$, in view of enhancing battery characteristics and safety.

The content of nickel in the lithium-nickel-cobalt-zinc composite oxide powder is expressed as an atomic ratio of (1-x-y). In view of the preferred value range of x and the preferred value range of y as described below, the atomic ratio of nickel is preferably greater than or equal to 0.55 and less than or equal to 0.95.

The element M corresponding to an added element is preferably at least one element selected from Mn, V, Mg, Mo, Nb, Si, Ti and Al. In particular, the element M may preferably be aluminum. The content of element M corresponding to an added element is expressed as an atomic ratio y, where $0 \leq y \leq 0.10$, and more preferably $0 < y \leq 0.10$, meaning the element M is necessarily included in the lithium-nickel-cobalt-zinc composite oxide powder. Note that even when the element M as an added element is not included in the lithium-nickel-cobalt-zinc composite oxide powder, sufficient battery characteristics may be exhibited when a positive electrode active material including the lithium-nickel-cobalt-zinc composite oxide powder is used as a positive electrode of a battery. However, by adding the element M to the positive electrode active material, a battery using the positive electrode active material may have improved durability characteristics and safety. In this respect, the added amount of the element M is preferably greater than zero. On the other hand, when the atomic ratio y exceeds 0.10, the amount of metal elements contributing to a redox reaction decreases and the battery capacity decreases.

The zinc (Zn) content with respect to Li, Ni, Co, element M, and oxygen in the lithium-nickel-cobalt-zinc composite oxide powder, namely, with respect to the elements other than zinc in the lithium-nickel-cobalt composite oxide (powder), is preferably greater than or equal to 0.01 mass % and less than or equal to 1.5 mass %, more preferably greater than or equal to 0.01 mass % and less than or equal to 1.0 mass %, and more preferably greater than or equal to 0.05 mass % and less than or equal to 0.8 mass %. When the zinc content is less than 0.01 mass %, the zinc solid-solved region formed on the surface of the lithium-nickel-cobalt-zinc composite oxide powder may not be adequately formed and atmospheric degradation may not be adequately prevented. When the zinc content is greater than 1.5 mass %, excessive zinc that could not be dissolved into the surface of the lithium-nickel-cobalt-zinc composite oxide powder may remain in the form of zinc oxide, which may form a resistance layer that hinders insertion/deinsertion of lithium. Further, when a large amount of zinc is added, the charge/discharge capacity per unit mass decreases owing to the fact that zinc does not contribute to charge/discharge.

Note that the zinc (Zn) content with respect to Li, Ni, Co, the element M, and oxygen in the lithium-nickel-cobalt-zinc composite oxide powder refers to a zinc (Zn) content with respect to the content of the elements other than zinc in the lithium-nickel-cobalt-zinc composite oxide powder; namely, Li, Ni, Co, the element M, and oxygen, that is defined as 100 mass %.

Also, the zinc solid-solved region refers to a region where zinc is solid-solved and is unevenly distributed on the surface of the lithium-nickel-cobalt-zinc composite oxide powder. As such, the zinc solid-solved region refers to a region that has a relatively high zinc concentration as compared with other parts and other regions of the lithium-nickel-cobalt-zinc composite oxide powder. In other words, when zinc is evenly distributed in the lithium-nickel-cobalt-zinc composite oxide powder, a zinc solid-solved region would not exist in the lithium-nickel-cobalt-zinc composite oxide powder.

As described above, it is not desirable to have zinc oxide remaining on the surface of the lithium-nickel-cobalt-zinc composite oxide powder included in the positive electrode active material. However, the presence of a relatively small amount of zinc oxide may be tolerated as long as it does not result in a resistance layer substantially affecting insertion/deinsertion of lithium. Note, however, that the surface of the lithium-nickel-cobalt-zinc composite oxide powder is preferably free of zinc oxide. The presence of zinc oxide is determined by elemental analysis of the surface of the lithium-nickel-cobalt-zinc composite oxide particles constituting the lithium-nickel-cobalt-zinc composite oxide powder included in the positive electrode active material. If particles having zinc as a main component are not detected on the particle surface, it may be determined that the particle surface is free of zinc oxide.

The solid-solved state of zinc in the lithium-nickel-cobalt-zinc composite powder may be determined by performing energy dispersive X-ray spectroscopy (EDX) analysis on the particle cross section of the lithium-nickel-cobalt-zinc composite powder using a scanning electron microscope or a transmission electron microscope. Specifically, by performing EDX analysis of the particle cross section, a region where zinc is abundant may be specified, and the thickness such a region may be determined.

The thickness of the zinc solid-solved region is preferably greater than or equal to 10 nm and less than or equal to 100 nm. When the thickness of the zinc solid-solved region is greater than or equal to 10 nm, atmospheric degradation may be more reliably prevented. On the other hand, when the thickness of the zinc solid-solved region is greater than 100 nm, excessive zinc that could not be solid-solved due to an increase in the amount of zinc added may come out onto the particle surface, or the zinc concentration in the zinc solid-solved region may decrease.

Note that the thickness of the zinc solid-solved region may be determined by analyzing a given lithium-nickel-cobalt-zinc composite powder included in the positive electrode active material, more specifically, a given particle constituting the lithium-nickel-cobalt-zinc composite powder, for example.

[pH]

The positive electrode active material for a nonaqueous electrolyte secondary battery according to the present embodiment, when dispersed in water at 5 mass % to form a suspension, preferably has a pH less than or equal to 11.8. This is because when the pH exceeds 11.8, gelation may occur when the positive electrode active material is kneaded into a paste.

[Average Particle Diameter]

The average particle diameter of the positive electrode active material for a nonaqueous electrolyte secondary battery according to the present embodiment is preferably greater than or equal to 3 µm and less than or equal to 25 µm. By arranging the average particle diameter to be within the above range, the battery capacity per volume can be increased, safety may be enhanced, and cycle characteristics may be improved.

Note that in the present description, the average particle diameter refers to a particle diameter at a midpoint (where the cumulative value is 50%) of the particle diameter distribution obtained by the laser diffraction/scattering method.

[Specific Surface Area]

The specific surface area of the positive electrode active material for a nonaqueous electrolyte secondary battery according to the present embodiment is preferably greater than or equal to 0.1 $m^2/g$ and less than or equal to 7.0 $m^2/g$. When the specific surface area is greater than or equal to 0.1 $m^2/g$, an adequate charge/discharge capacity can be obtained. When the specific surface area is less than or equal to 7.0 $m^2/g$, the safety of the positive electrode active material may be ensured and enhanced.

Note that the average particle diameter and the specific surface area hardly change even when the coating step and the heat treatment step are performed, and as such, the average particle diameter and the specific surface area of the lithium-nickel-cobalt composite oxide powder used as the raw material of the positive electrode active material may be assumed to be the average particle diameter and the specific surface area of the positive electrode active material, for example.

By using the above-described positive electrode active material according to the present embodiment as a positive electrode material of a battery, atmospheric degradation of the positive electrode active material that causes an increase in positive electrode resistance of the battery and a decrease in discharge capacity can be prevented, and a positive electrode active material for a nonaqueous electrolyte secondary battery having high capacity and excellent output characteristics can be obtained.

Also, the above-described method for producing a positive electrode active material is simple and suitable for production on an industrial scale and therefore has significant industrial value.

3. Nonaqueous Electrolyte Secondary Battery

A nonaqueous electrolyte secondary battery according to the present embodiment includes a positive electrode, a negative electrode, a separator, and a nonaqueous electrolytic solution, similar to a general nonaqueous electrolyte secondary battery. In the following, the components of the nonaqueous electrolyte secondary battery, and the shape and configuration of the battery will be described in detail.

[Positive Electrode]

A positive electrode mixture material forming a positive electrode and the materials constituting the same will be described below. The positive electrode mixture material (positive electrode mixture material paste) is produced by mixing together the positive electrode active material according to the present embodiment that is in powder form, a conductive material, and a binder; and further adding activated carbon and/or a solvent for viscosity control as necessary; and kneading the mixture into a paste. Note that the mixing ratio of the respective materials in the positive electrode mixture material may also be an important factor determining the performance of the lithium secondary battery.

Although the mixing ratio of the respective materials in the positive electrode mixture is not particularly limited, the mixing ratio may be similar to that of a general lithium secondary battery. For example, assuming the total mass of solid materials in the positive electrode mixture material excluding the solvent is defined as 100 mass %, the positive electrode active material is preferably included at a ratio greater than or equal to 60 mass % and less than or equal to 95 mass %, the conductive material is preferably included at a ratio greater than or equal to 1 mass % and less than or equal to 20 mass %, and the binder is included at a ration greater than or equal to 1 mass % and less than or equal to 20 mass %.

The resulting positive electrode mixture is applied to the surface of a current collector made of aluminum foil, for example, and dried to scatter the solvent. Also, if necessary, the positive electrode mixture may be pressed by a roll press or the like to increase the electrode density. In this way, a sheet-shaped positive electrode can be produced. The sheet-shaped positive electrode may be cut into an appropriate size according to a desired battery and used to produce the desired battery, for example. However, the method of producing the positive electrode is not limited to the above-described example, and other methods may be used as well.

Note that the conductive material used for producing the above-described positive electrode may be, for example, graphite (natural graphite, artificial graphite, expanded graphite) or carbon black material, such as acetylene black or ketjen black.

The binder is for binding together the particles constituting the positive electrode active material. The binder used in the positive electrode mixture material may be, for example, polytetrafluoroethylene (PTFE), polyvinylidene fluoride (PVDF), ethylene propylene diene rubber, fluorine-containing resin such as fluororubber, styrene butadiene, cellulose resin, or thermoplastic resin such as polyacrylic acid, polypropylene, polyethylene or the like.

Also, if necessary, a solvent that dissolves the binder and causes the positive electrode active material, the conductive material, and the activated carbon to disperse in the binder may be added to the positive electrode mixture material. The solvent to be used may be an organic solvent such as N-methyl-2-pyrrolidone, for example. Also, activated carbon may be added to the positive electrode mixed material to increase the electric double layer capacity of the positive electrode, for example.

[Negative Electrode]

The negative electrode used in the nonaqueous electrolyte secondary battery according to the present embodiment is preferably formed by mixing together a binder and a negative electrode active material that is capable of sustaining insertion/deinsertion of lithium ions, such as metallic lithium, a lithium alloy, or the like, adding a suitable solvent to the mixture to form a negative electrode mixture material paste, applying the negative electrode mixture material paste onto the surface of a metal foil current collector made of copper, for example, drying the negative electrode mixture material paste, and then compressing it to increase the electrode density as necessary.

The negative electrode active material that is used may be, for example, an organic compound fired body, such as natural graphite, artificial graphite, or a phenolic resin, or a powder of a carbon substance such as coke (petroleum coke). In this case, the negative electrode binder, like the positive electrode binder, may be a fluorine-containing resin such as polyvinylidene fluoride or the like, for example. The solvent used for dispersing the active material and the binder may be an organic solvent such as N-methyl-2-pyrrolidone, for example.

[Separator]

The separator is interposed between the positive electrode and the negative electrode. The separator separates the positive electrode and the negative electrode and holds electrolyte. The separator may be a thin film of polyethylene or polypropylene having a large number of fine pores, for example.

[Nonaqueous Electrolyte]

The nonaqueous electrolyte is obtained by dissolving a lithium salt as a supporting salt in an organic solvent. Examples of the organic solvent include cyclic carbonates, such as ethylene carbonate, propylene carbonate, butylene carbonate, and trifluoropropylene carbonate; chain carbonates, such as diethyl carbonate, dimethyl carbonate, ethylmethyl carbonate, and dipropyl carbonate; ether compounds, such as tetrahydrofuran, 2-methyltetrahydrofuran, and dimethoxyethane; a sulfur compound, such as ethylmethylsulfone and butane sultone; phosphorus compounds, such as triethyl phosphate and trioctyl phosphate. These substances may be used alone or in combination as the organic solvent.

Examples of the supporting salt include $LiPF_6$, $LiBF_4$, $LiClO_4$, $LiAsF_6$, $LiN(CF_3SO_2)_2$, complex salts thereof.

The nonaqueous electrolyte may also contain a radical scavenger, a surfactant, a flame retardant, and the like.

[Battery Shape and Configuration]

The lithium secondary battery according to the present embodiment including the positive electrode, the negative electrode, the separator, and the nonaqueous electrolyte as described above can be in various shapes and configurations including a cylindrical configuration, a laminated configuration, and the like.

Regardless of the battery shape and configuration, the positive electrode, the negative electrode, and the separator interposed between the two electrodes are stacked to fault an electrode body, and the nonaqueous electrolyte is impregnated in the electrode body. Then, connections are made between a positive electrode current collector and an externally connected positive electrode terminal and between a negative electrode current collector and an externally connected negative electrode terminal using current collecting leads or the like. Then the above structure may be hermetically enclosed in a battery case to produce the battery.

EXAMPLES

In the following, the present invention will be described in detail with reference to examples of the present invention and comparative examples. Note, however, that the present invention is in no way limited by these examples. The examples and comparative examples were evaluated based on the measurements made using the apparatuses and methods described below.

[Positive Electrode Active Material Overall Composition]

The positive electrode active materials obtained in the examples and comparative examples were dissolved with nitric acid and then measured with an ICP emission spectroscopic analyzer (ICPS-8100, manufactured by Shimadzu Corporation).

[Positive Electrode Active Material Particle Cross Section Composition]

The cross sections of the particles constituting the positive electrode active materials obtained in the examples and comparative examples were imaged using a scanning electron microscope (S-4700, manufactured by Hitachi High-Tech Fielding Corporation) and subjected to EDX analysis (Genesis by AMETEK, Inc.). Also, based on the analysis results, the presence/absence of zinc oxide on the particle surface and the presence/absence of a zinc solid-solved region were determined and the thickness of the zinc solid-solved region was measured.

Figure 3:
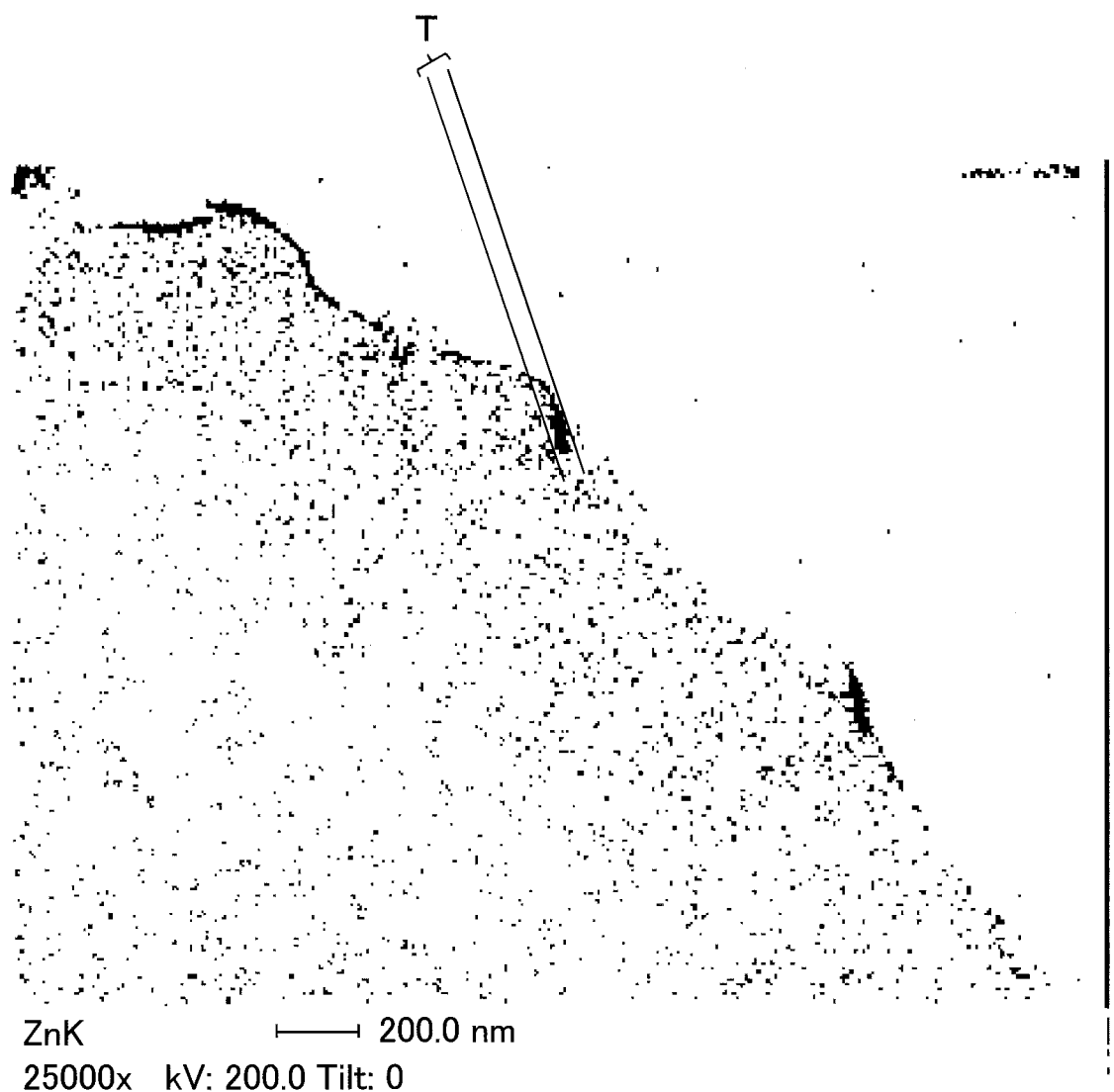
FIG. 3 is a zinc mapping of a cross section of a positive electrode active material according to Example 3.

FIG. 3 shows a zinc mapping of the cross section of the positive electrode active material obtained in Example 3. Note that in FIG. 3, T represents the thickness of the zinc solid-solved region.

[Suspension pH]

A 5-mass % suspension was prepared from each of the positive electrode active materials obtained in the examples and comparative examples by suspending 5.0 g of the positive electrode active material powder in 100 ml of pure water, and after stirring the suspension at a room temperature of 25° C. for 30 minutes, the pH of the suspension was measured. The column "POSITIVE ELECTRODE ACTIVE MATERIAL SUSPENSION pH" in Table 2 below indicates the resulting pH measurements.

[Evaluation of Battery Characteristics]

Production of Coin Type Battery for Evaluation

A positive electrode was produced from each of the positive electrode active materials obtained in the examples and comparative examples by mixing together 70 mass % of the positive electrode active material, 20 mass % of acetylene black, and 10 mass % of PTFE, and extracting 150 mg of the mixture to prepare a pellet constituting the positive electrode. Lithium metal was used as a negative electrode. A porous polyethylene film having a thickness of 25 μm was used as a separator. An electrolyte solution with 1 M $LiClO_4$ as a supporting salt in an equal amount mixed solution of ethylene carbonate (EC) and diethyl carbonate (DEC) (manufactured by Toyama Chemical Industry Co., Ltd.) was used as the electrolyte. Then, a CR2032 coin type battery as shown in FIG. 1 was produced in a glove box with an Ar atmosphere controlled to have a dew point of −80° C. Note that a top portion of FIG. 1 shows a perspective view of the coin type battery 10, and a lower portion of FIG. 1 shows a schematic cross-sectional view of the coin type battery 10 across a line passing through the center of the coin type battery 10.

As shown in FIG. 1, the coin type battery 10 includes a case and an electrode accommodated in the case.

The case includes a positive electrode can 6 that is hollow and open at one end and a negative electrode can 5 that is arranged at the opening of the positive electrode can 6. By arranging the negative electrode can 5 at the opening of the positive electrode can 6, a space for accommodating an electrode is formed between the negative electrode can 5 and the positive electrode can 6.

The electrode includes a positive electrode 3, a separator 2, and a negative electrode 1 that are stacked one on top of the other in the above recited order. The positive electrode 3 is in contact with the inner surface of the positive electrode can 6 via a current collector 7, and the negative electrode 1 is in contact with the inner surface of the negative electrode can 5 via a current collector 7. A current collector 7 is also arranged between the positive electrode 3 and the separator 2.

Note that the case includes a gasket 4, which fixes the positive electrode can 6 and the negative electrode can 5 in place to maintain electrical insulation between the positive electrode can 6 and the negative electrode can 5. The gasket 4 also has a function of sealing the gap between the positive electrode can 6 and the negative electrode can 5 and insulating the interior of the case from the exterior in an air-tight and liquid-tight manner.

Discharge Capacity

The coin type battery that has been produced was left for about 24 hours, and after the open circuit voltage (OCV) was stabilized, the current density with respect to the positive electrode was set to 0.5 mA/cm$^2$ and the coin type battery was charged to a cutoff voltage of 4.3 V as the charge capacity. After pausing for 1 hour, the coin type battery was discharged to a cutoff voltage of 3.0 V and the capacity of the discharge was evaluated as the discharge capacity.

Positive Electrode Resistance

Figure 2A:
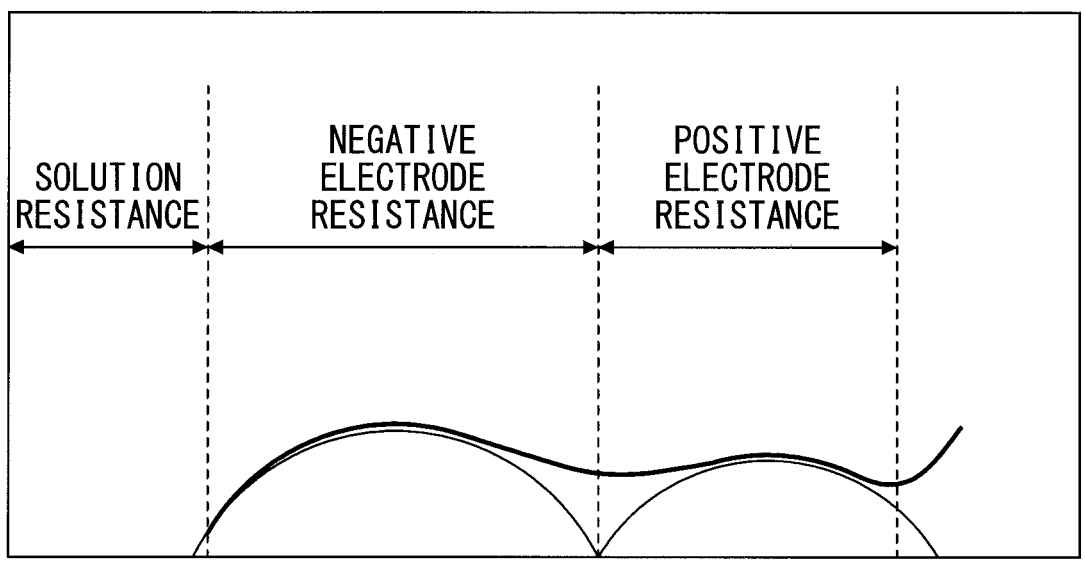
FIG. 2A is a schematic diagram showing an example impedance measurement.
Figure 2B:
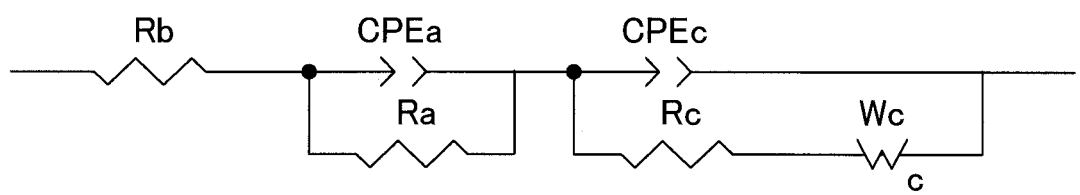
FIG. 2B is a schematic diagram of an equivalent circuit used for analyzing the impedance measurement.

The coin type battery that has been produced was charged at a charging potential of 4.1 V and subjected to measurement by an alternating current impedance measurement technique using a frequency response analyzer/potentiogalvanostat (1255B, manufactured by Solartron Analytical). FIG. 2A is a Nyquist plot obtained by the measurement. The Nyquist plot is expressed as the sum of characteristic curves representing the solution resistance, the negative electrode resistance and its capacity, and the positive electrode resistance and its capacity. Thus, based on the Nyquist plot, fitting calculation was performed using the equivalent circuit shown in FIG. 2B to calculate the value of the positive electrode resistance (reaction resistance).

Example 1

A lithium-nickel-cobalt composite oxide powder represented by the formula $Li_{1.03}Ni_{0.82}Co_{0.15}Al_{0.03}O_2$ that has been obtained by a known technique of mixing together an oxide powder containing nickel as a main component and lithium hydroxide and firing the mixture was uses as a base material. The average particle diameter of the lithium-nickel-cobalt composite oxide powder, measured by the laser diffraction/scattering method, was 12.0 μm, and the specific surface area was 1.2 m$^2$/g. The average particle diameter was measured by a laser diffraction particle size distribution meter (Microtrac MT3300 EXII, manufactured by Nikkiso Co., Ltd.), and the specific surface area was measured by a specific surface area measuring device (QUATASOVE QS-10, manufactured by Yuasa Ionics Co., Ltd.) using the Brunauer-Emmett-Teller (BET) nitrogen gas adsorption method.

Then, the lithium-nickel-cobalt composite oxide powder was subjected to the following coating step. In the coating step, the crystallization/dipping method, more specifically, the crystallization method was used.

A suspension was prepared by adding the lithium-nickel-cobalt composite oxide powder to an aqueous solution of lithium hydroxide that was adjusted to have a lithium content of 1.5 g/L, and the concentration of the lithium-nickel-cobalt composite oxide in the suspension was adjusted to 750 g/L. A zinc sulfate aqueous solution was added to this suspension so that the zinc content would be 0.2 mass % with respect to the lithium-nickel-cobalt composite oxide, and the mixture was stirred for 30 minutes and then filtered to separate the solid matter.

Note that because the suspension is prepared using an aqueous lithium hydroxide solution during the coating step, zinc hydroxide is precipitated on the surface of each lithium-nickel-cobalt composite oxide particle constituting the lithium-nickel-cobalt composite oxide powder. In other words, the crystallization method is used in the coating process of Example 1 as described above. The same also applies to Examples 2 to 7 described below.

The solid matter separated from the suspension was dried under a vacuum atmosphere at a temperature of 210° C. for 14 hours to obtain a lithium-nickel-cobalt composite oxide powder coated with a compound containing zinc (drying step). The drying time was selected so that the moisture content of the dried powder would be less than or equal to 0.05 mass %. Note that the drying time was selected in a similar manner when performing the drying step in each of the other examples and comparative examples described below.

Thereafter, a heat treatment was performed at 600° C. in an oxygen atmosphere for 1 hour to obtain a positive electrode active material according to Example 1 (heat treatment step).

Note that the obtained positive electrode active material was composed of a lithium-nickel-cobalt-zinc composite oxide powder having a molar ratio Li:Ni:Co:Al of 1.03:0.82:0.15:0.03, and a zinc content of 0.2 mass % with respect to Li, Ni, Co, the element M, and oxygen in the lithium-nickel-cobalt-zinc composite oxide powder.

Note that the production conditions used for producing the positive electrode active material are summarized in Table 1 below.

The obtained positive electrode active material was suspended in pure water under the above conditions, and the pH of the suspension was measured.

The cross section of the obtained positive electrode active material was imaged with a scanning electron microscope and element analysis was performed to determine the presence/absence of zinc oxide on the particle surface and measure the thickness of the zinc solid-solved region.

Further, a weathering test was conducted on the obtained positive electrode active material by leaving the positive electrode active material in the atmosphere at a temperature of 80° C. and a humidity of 60% for 24 hours, and the positive electrode active materials before and after the weathering test were respectively used to produce coin type batteries for evaluation as described above. Then, the discharge capacity and the positive electrode resistance of each of the batteries were measured, and the discharge capacity degradation and the positive electrode resistance increase were evaluated. Note that the positive electrode resistance is expressed as a relative numerical value relative to the positive electrode resistance measurement of the coin type battery produced using the positive electrode active material of Example 1 before being exposed to the atmosphere (i.e., not subjected to the weathering test) that is set to 100. The same applies to the other examples and comparative examples described below.

Note that the evaluation results are summarized in Table 2.

Example 2

In Example 2, a positive electrode active material was produced in the same manner as in Example 1 except that an aqueous solution of zinc sulfate adjusted to have a zinc content of 0.03 mass % with respect to the lithium-nickel-cobalt composite oxide was added in the coating step, and the obtained positive electrode active material was evaluated.

The obtained positive electrode active material was composed of a lithium-nickel-cobalt-zinc composite oxide powder having a molar ratio Li:Ni:Co:Al of 1.03:0.82:0.15:0.03 and a zinc content of 0.03 mass % with respect to Li, Ni, Co, the element M, and oxygen in the lithium-nickel-cobalt-zinc composite oxide powder.

Note that the production conditions used for producing the positive electrode active material are summarized in Table 1, and the evaluation results of the positive electrode active material are summarized in Table 2.

Example 3

In Example 3, a positive electrode active material was produced in the same manner as in Example 1 except that an aqueous solution of zinc sulfate adjusted to have a zinc content of 0.5 mass % with respect to the lithium-nickel-cobalt composite oxide was added in the coating step, and the obtained positive electrode active materials was evaluated.

The obtained positive electrode active material was composed of a lithium-nickel-cobalt-zinc composite oxide powder having a molar ratio Li:Ni:Co:Al of 1.03:0.82:0.15:0.03, and a zinc content of 0.5 mass % with respect to Li, Ni, Co, the element M, and oxygen in the lithium-nickel-cobalt-zinc composite oxide powder.

Note that the production conditions used for producing the positive electrode active material are summarized in Table 1, and the evaluation results of the positive electrode active material are summarized in Table 2. Also, FIG. 3 shows a zinc mapping of a cross section of the positive electrode active material obtained in Example 3.

Example 4

In Example 4, a positive electrode active material was produced in the same manner as in Example 1 except that an aqueous solution of zinc sulfate adjusted to have a zinc content of 1.0 mass % with respect to the lithium-nickel-cobalt composite oxide was added in the coating step, and the obtained positive electrode active material was evaluated.

The obtained positive electrode active material was composed of a lithium-nickel-cobalt-zinc composite oxide powder having a molar ratio Li:Ni:Co:Al of 1.03:0.82:0.15:0.03, and a zinc content of 1.0 mass % with respect to Li, Ni, Co, the element M, and oxygen in the lithium-nickel-cobalt-zinc composite oxide powder.

Note that the production conditions used for producing the positive electrode active material are summarized in Table 1, and the evaluation results of the positive electrode active material are summarized in Table 2.

Example 5

In Example 5, a positive electrode active material was produced in the same manner as in Example 1 except that an aqueous solution of zinc sulfate adjusted to have a zinc content of 1.5 mass % with respect to the lithium-nickel-cobalt composite oxide was added in the coating step, and the obtained positive electrode active material was evaluated.

The obtained positive electrode active material was composed of a lithium-nickel-cobalt-zinc composite oxide powder having a molar ratio Li:Ni:Co:Al of 1.03:0.82:0.15:0.03, and a zinc content of 1.5 mass % with respect to Li, Ni, Co, the element M, and oxygen in the lithium-nickel-cobalt-zinc composite oxide powder.

Note that the production conditions used for producing the positive electrode active material are summarized in Table 1, and the evaluation results of the positive electrode active material are summarized in Table 2.

Example 6

In Example 6, a positive electrode active material was produced in the same manner as in Example 1 except that the heat treatment temperature was set to 300° C. in the heat treatment step, and the obtained positive electrode active material was evaluated.

The obtained positive electrode active material was composed of a lithium-nickel-cobalt-zinc composite oxide powder having a molar ratio Li:Ni:Co:Al of 1.03:0.82:0.15:0.03, and a zinc content of 0.2 mass % with respect to Li, Ni, Co, the element M, and oxygen in the lithium-nickel-cobalt-zinc composite oxide powder.

Note that the production conditions used for producing the positive electrode active material are summarized in Table 1, and the evaluation results of the positive electrode active material are summarized in Table 2.

Example 7

In Example 7, a positive electrode active material was produced in the same manner as in Example 1 except that zinc chloride was used as a zinc compound instead of zinc sulfide in the coating step, and the obtained positive electrode active material was evaluated.

The obtained positive electrode active material was composed of a lithium-nickel-cobalt-zinc composite oxide powder having a molar ratio Li:Ni:Co:Al of 1.03:0.82:0.15:0.03, and a zinc content of 0.2 mass % with respect to Li, Ni, Co, the element M, and oxygen in the lithium-nickel-cobalt-zinc composite oxide powder.

Note that the production conditions used for producing the positive electrode active material are summarized in Table 1, and the evaluation results of the positive electrode active material are summarized in Table 2.

Example 8

In Example 8, in the coating step, the same lithium-nickel-cobalt composite oxide powder used in Example 1 was added to pure water to prepare a suspension having a concentration of 750 g/L. Then, a zinc sulfate aqueous solution adjusted to have a zinc content of 0.5 mass % with respect to the lithium-nickel-cobalt composite oxide was added to the suspension after which the suspension was stirred for 30 minutes and then subjected to filtration. Aside from the above-noted conditions, a positive electrode active material was produced and evaluated in the same manner as in Example 1.

Note that in the present example, unlike Example 1, a suspension was prepared using pure water in the coating step. As such, a compound containing zinc was not precipitated on the surface of the lithium-nickel-cobalt composite oxide powder. In other words, the immersion method was used in the coating step in the present example.

The obtained positive electrode active material was composed of a lithium-nickel-cobalt-zinc composite oxide powder having a molar ratio Li:Ni:Co:Al of 1.03:0.82:0.15:0.03, and a zinc content of 0.5 mass % with respect to Li, Ni, Co, the element M, and oxygen in the lithium-nickel-cobalt-zinc composite oxide powder.

Note that the production conditions used for producing the positive electrode active material are summarized in Table 1, and the evaluation results of the positive electrode active material are summarized in Table 2.

Example 9

In Example 9, a positive electrode active material was produced in the same manner as in Example 1 except that the washing step was performed before the coating step and the spraying method was used in the coating step, and the obtained positive electrode active material was evaluated.

In the washing step, the same lithium-nickel-cobalt composite oxide powder used in Example 1 was added to a lithium hydroxide aqueous solution adjusted to have a lithium content of 1.5 g/L to prepare a suspension having a concentration of 750 g/L, and the obtained suspension was stirred for 30 minutes after which the solid matter was separated by filtration. Then, the separated solid matter (powder) was dried under a vacuum atmosphere at a temperature of 210° C. for 14 hours to obtain a lithium-nickel-cobalt composite oxide powder having excess lithium compound components removed from its surface.

In the coating step, the lithium-nickel-cobalt composite oxide powder having excess lithium compound components removed from its surface in the washing step was sprayed with a zinc sulfate aqueous solution containing zinc at 0.2 mass % with respect to the lithium-nickel-cobalt composite oxide to obtain a lithium-nickel-cobalt composite oxide powder coated with a compound containing zinc.

The lithium-nickel-cobalt composite oxide powder coated with a compound containing zinc was subjected to a drying step and a heat treatment step. The drying step and the heat treatment step were carried out under the same conditions as in Example 1, and as such, their explanations will be omitted.

The obtained positive electrode active material was composed of a lithium-nickel-cobalt-zinc composite oxide powder having a molar ratio Li:Ni:Co:Al of 1.03:0.82:0.15:0.03, and a zinc content of 0.2 mass % with respect to Li, Ni, Co, the element M, and oxygen in the lithium-nickel-cobalt-zinc composite oxide powder.

The preparation conditions of the positive electrode active material are summarized in Table 1, and the evaluation results of the positive electrode active material are summarized in Table 2.

Example 10

A positive electrode active material was produced in the same manner as in Example 9 except that the powder mixing method was used instead of the spraying method in the coating step and the drying step after the coating step was not performed, and the obtained positive electrode active material was evaluated.

In the coating step, the lithium-nickel-cobalt composite oxide powder having excess lithium compound components removed from its surface by the washing and drying performed in the washing step was mixed with a zinc hydroxide powder so that the zinc content of the mixture with respect to the lithium-nickel-cobalt composite oxide would be 0.2 mass %.

Then, a heat treatment step was performed in the same manner as in Example 9.

The obtained positive electrode active material was composed of a lithium-nickel-cobalt-zinc composite oxide powder having a molar ratio Li:Ni:Co:Al of 1.03:0.82:0.15:0.03, and a zinc content of 0.2 mass % with respect to Li, Ni, Co, the element M, and to oxygen in the lithium-nickel-cobalt-zinc composite oxide powder.

Note that the production conditions used for producing the positive electrode active material are summarized in Table 1, and the evaluation results of the positive electrode active material are summarized in Table 2.

Example 11

A positive electrode active material was produced in the same manner as in Example 1 except that the spraying method was used in the coating process, and the obtained positive electrode active material was evaluated.

In the coating process, the same lithium-nickel-cobalt composite oxide powder used in Example 1 was sprayed with a zinc sulfate aqueous solution so that a zinc content with respect to the lithium-nickel-cobalt composite oxide would be 0.2 mass %, a lithium-nickel-cobalt composite oxide powder coated with a compound containing zinc was obtained.

The lithium nickel cobalt composite oxide powder coated with a compound containing zinc was subjected to a drying step and a heat treatment step. The drying step and the heat treatment step were performed under the same conditions as in Example 1, and as such, explanations thereof will be omitted.

The obtained positive electrode active material was composed of a lithium-nickel-cobalt-zinc composite oxide powder having a molar ratio Li:Ni:Co:Al of 1.03:0.82:0.15:0.03, and a zinc content of 0.2 mass % with respect to Li, Ni, Co, the element M, and oxygen in the lithium-nickel-cobalt-zinc composite oxide powder.

Note that the production conditions used for producing the positive electrode active material are summarized in Table 1, and the evaluation results of the positive electrode active material are summarized in Table 2.

Comparative Example 1

In Comparative Example 1, a positive electrode active material was obtained in the same manner as in Example 1 except that the coating step was not performed.

The obtained positive electrode active material had a molar ratio Li:Ni:Co:Al of 1.03:0.82:0.15:0.03, and a zinc content of 0 mass % with respect to Li, Ni, Co, the element M, and oxygen.

Note that the production conditions used for producing the positive electrode active material are summarized in Table 1, and the evaluation results of the positive electrode active material are summarized in Table 2.

Comparative Example 2

In Comparative Example 2, a positive electrode active material was obtained in the same manner as in Example 1 except that pure water was added instead of the zinc sulfate aqueous solution in the coating step.

The obtained positive electrode active material had a molar ratio Li:Ni:Co:Al of 1.03:0.82:0.15:0.03, and a zinc content of 0 mass % with respect to Li, Ni, Co, the element M, and oxygen.

Note that the production conditions used for producing the positive electrode active material are summarized in Table 1, and the evaluation results of the positive electrode active material are summarized in Table 2.

Comparative Example 3

In Comparative Example 3, a positive electrode active material was obtained in the same manner as in Example 1 except that in the coating step, a zinc sulfate aqueous solution adjusted to have a zinc content of 2.0 mass % with respect to the lithium-nickel-cobalt composite oxide was added.

The obtained positive electrode active material had a molar ratio Li:Ni:Co:Al of 1.03:0.82:0.15:0.03, and a zinc content of 2.0 mass % with respect to Li, Ni, Co, the element M, and oxygen.

Note that the production conditions used for producing the positive electrode active material are summarized in Table 1, and the evaluation results of the positive electrode active material are summarized in Table 2.

Comparative Example 4

In Comparative Example 4, a positive electrode active material was obtained in the same manner as in Example 1 except that the heat treatment temperature was set to 150° C. in the heat treatment step.

The obtained positive electrode active material had a molar ratio Li:Ni:Co:Al of 1.03:0.82:0.15:0.03, and a zinc content of 0.2 mass % with respect to Li, Ni, Co, the element M, and oxygen.

Note that the production conditions used for producing the positive electrode active material are summarized in Table 1, and the evaluation results of the positive electrode active material are summarized in Table 2.

Comparative Example 5

In Comparative Example 5, a positive electrode active material was obtained in the same manner as in Example 1 except that the heat treatment time was set to 24 hours in the heat treatment step. The production conditions used for producing the positive electrode active material are summarized in Table 1, and the evaluation results of the positive electrode active material are summarized in Table 2.

The obtained positive electrode active material had a molar ratio of Li:Ni:Co:Al of 1.03:0.82:0.15:0.03, and a zinc content of 0.2 mass % with respect to Li, Ni, Co, the element M, and oxygen.

Note that the production conditions used for producing the positive electrode active material are summarized in Table 1, and the evaluation results of the positive electrode active material are summarized in Table 2.

TABLE 1

| | WASHING STEP | $Li_zNi_{1-x-y}Co_xM_yO_2$ COMPOSITION RATIO | | | | ZINC ADDING CONDITIONS | | | HEAT TREATMENT CONDITIONS | | |
|---|---|---|---|---|---|---|---|---|---|---|---|
| | | Li z | Ni 1-x-y | Co x | M y | ZINC AMOUNT (CONTENT RATIO) MASS % | COMPOUND CONTAINING ZINC | ADDING METHOD | HEAT TREATMENT TEMPERATURE ° C. | HEAT TREATMENT TIME hr | ATMOSPHERE |
| EXAMPLE 1 | NO | 1.03 | 0.82 | 0.15 | 0.03 | 0.2 | ZINC SULFATE | CRYSTALLIZATION METHOD | 600 | 1 | OXYGEN |
| EXAMPLE 2 | NO | 1.03 | 0.82 | 0.15 | 0.03 | 0.03 | ZINC SULFATE | CRYSTALLIZATION METHOD | 600 | 1 | OXYGEN |
| EXAMPLE 3 | NO | 1.03 | 0.82 | 0.15 | 0.03 | 0.5 | ZINC SULFATE | CRYSTALLIZATION METHOD | 600 | 1 | OXYGEN |
| EXAMPLE 4 | NO | 1.03 | 0.82 | 0.15 | 0.03 | 1.0 | ZINC SULFATE | CRYSTALLIZATION METHOD | 600 | 1 | OXYGEN |
| EXAMPLE 5 | NO | 1.03 | 0.82 | 0.15 | 0.03 | 1.5 | ZINC SULFATE | CRYSTALLIZATION METHOD | 600 | 1 | OXYGEN |
| EXAMPLE 6 | NO | 1.03 | 0.82 | 0.15 | 0.03 | 0.2 | ZINC SULFATE | CRYSTALLIZATION METHOD | 300 | 1 | OXYGEN |
| EXAMPLE 7 | NO | 1.03 | 0.82 | 0.15 | 0.03 | 0.2 | ZINC CHLORIDE | CRYSTALLIZATION METHOD | 600 | 1 | OXYGEN |
| EXAMPLE 8 | NO | 1.03 | 0.82 | 0.15 | 0.03 | 0.5 | ZINC SULFATE | IMMERSION METHOD | 600 | 1 | OXYGEN |
| EXAMPLE 9 | YES | 1.03 | 0.82 | 0.15 | 0.03 | 0.2 | ZINC SULFATE | SPRAYING METHOD | 600 | 1 | OXYGEN |
| EXAMPLE 10 | YES | 1.03 | 0.82 | 0.15 | 0.03 | 0.2 | ZINC HYDROXIDE | POWDER MIXING METHOD | 600 | 1 | OXYGEN |
| EXAMPLE 11 | NO | 1.03 | 0.82 | 0.15 | 0.03 | 0.2 | ZINC SULFATE | SPRAYING METHOD | 600 | 1 | OXYGEN |
| COMPARATIVE EXAMPLE 1 | NO | 1.03 | 0.82 | 0.15 | 0.03 | 0 | — | — | 600 | 1 | OXYGEN |
| COMPARATIVE EXAMPLE 2 | NO | 1.03 | 0.82 | 0.15 | 0.03 | 0 | — | — | 600 | 1 | OXYGEN |

TABLE 1-continued

| | WASHING STEP | $Li_zNi_{1-x-y}Co_xM_yO_2$ COMPOSITION RATIO | | | | ZINC ADDING CONDITIONS | | | HEAT TREATMENT CONDITIONS | | |
|---|---|---|---|---|---|---|---|---|---|---|---|
| | | | | | | ZINC AMOUNT (CONTENT RATIO) MASS % | COMPOUND CONTAINING ZINC | ADDING METHOD | HEAT TREATMENT TEMPERATURE °C | HEAT TREATMENT TIME hr | ATMOSPHERE |
| | | z | Ni 1-x-y | Co x | M y | | | | | | |
| COMPARATIVE EXAMPLE 3 | NO | 1.03 | 0.82 | 0.15 | 0.03 | 2.0 | ZINC SULFATE | CRYSTALLIZATION METHOD | 600 | 1 | OXYGEN |
| COMPARATIVE EXAMPLE 4 | NO | 1.03 | 0.82 | 0.15 | 0.03 | 0.2 | ZINC SULFATE | CRYSTALLIZATION METHOD | 150 | 1 | OXYGEN |
| COMPARATIVE EXAMPLE 5 | NO | 1.03 | 0.82 | 0.15 | 0.03 | 0.2 | ZINC SULFATE | CRYSTALLIZATION METHOD | 600 | 24 | OXYGEN |

TABLE 2

| | POSITIVE ELECTRODE ACTIVE MATERIAL SUSPENSION pH | ZINC STATE | | ZINC SOLID-SOLVED REGION THICKNESS nm | BEFORE ATMOSPHERE EXPOSURE (BEFORE WEATHERING TEST) | | AFTER ATMOSPHERE EXPOSURE (AFTER WEATHERING TEST) | |
|---|---|---|---|---|---|---|---|---|
| | | PARTICLE SURFACE ZINC OXIDE PRESENCE | ZINC SOLID-SOLVED REGION PRESENCE | | DISCHARGE CAPACITY mAh/g | POSITIVE ELECTRODE RESISTANCE RELATIVE VALUE | DISCHARGE CAPACITY mAh/g | POSITIVE ELECTRODE RESISTANCE RELATIVE VALUE |
| EXAMPLE 1 | 11.3 | NO | ○ | 20 | 205 | 100 | 184 | 110 |
| EXAMPLE 2 | 11.3 | NO | ○ | 5 | 207 | 97 | 184 | 121 |
| EXAMPLE 3 | 11.3 | NO | ○ | 50 | 202 | 110 | 178 | 141 |
| EXAMPLE 4 | 11.4 | NO | ○ | 90 | 200 | 117 | 176 | 152 |
| EXAMPLE 5 | 11.3 | NO | ○ | 100 | 197 | 116 | 182 | 119 |
| EXAMPLE 6 | 11.4 | NO | ○ | 30 | 198 | 152 | 174 | 183 |
| EXAMPLE 7 | 11.3 | NO | ○ | 25 | 204 | 103 | 183 | 114 |
| EXAMPLE 8 | 114 | NO | ○ | 35 | 203 | 103 | 183 | 110 |
| EXAMPLE 9 | 11.2 | NO | ○ | 25 | 202 | 100 | 181 | 114 |
| EXAMPLE 10 | 11.2 | NO | ○ | 20 | 201 | 107 | 183 | 121 |
| EXAMPLE 11 | 11.8 | NO | ○ | 30 | 200 | 76 | 185 | 79 |
| COMPARATIVE EXAMPLE 1 | 12.2 | NO | x | 0 | 180 | 145 | 150 | 417 |
| COMPARATIVE EXAMPLE 2 | 11.2 | NO | x | 0 | 209 | 93 | 170 | 221 |
| COMPARATIVE EXAMPLE 3 | 11.3 | YES | ○ | 210 | 200 | 224 | 180 | 283 |
| COMPARATIVE EXAMPLE 4 | 11.3 | YES | x | 0 | 201 | 269 | 181 | 355 |
| COMPARATIVE EXAMPLE 5 | 11.3 | NO | x | 0 | 205 | 103 | 172 | 217 |

(Evaluation)

As can be appreciated from Tables 1 and 2, the positive electrode active materials obtained in Examples 1 to 11 were composed of lithium-nickel-cobalt composite oxide powders (particles) having zinc solid-solved regions formed on their surfaces. As such, the positive electrode active materials obtained in Examples 1 to 11 had high discharge capacities and low positive electrode resistance even after being subjected to a weathering test (after being exposed to the atmosphere). That is, the obtained positive electrode active materials exhibited desirable characteristics as a positive electrode active material.

On the other hand, in Comparative Example 1, no zinc was dissolved into the surface of the lithium nickel cobalt composite oxide powder (particles). Also, because no washing process was performed, unreacted lithium hydroxide remained on the particle surface to cause gelation upon kneading the positive electrode active material into a paste. As a result, the discharge capacity the positive electrode active material obtained in Comparative Example 1 even before being exposed to the atmosphere was lower as compared with the discharge capacities of the positive electrode active materials obtained in Examples 1 to 11.

In Comparative Example 2, although a washing process was performed during the coating step, because zinc was not added, a zinc solid-solved region was not formed on the surface of the lithium nickel cobalt composite oxide powder (particles). As a result, the positive electrode active material obtained in Comparative Example 2 that has been subjected to the weathering test (after being exposed to the atmosphere) exhibited a substantial increase in reaction resistance and discharge capacity degradation.

In Comparative Example 3, the amount of zinc added in the coating step was excessive, and as a result, a zinc oxide film was formed by zinc that could not be dissolved into the lithium-nickel-cobalt composite oxide powder. As such, the positive electrode active material obtained in Comparative Example 3 even before being exposed to the atmosphere exhibited a substantial increase in reaction resistance as compared with the reaction resistance of the positive electrode active materials obtained in Examples 1 to 11.

In Comparative Example 4, because the heat treatment temperature was set to a comparatively low temperature, zinc could not be solid-solved; that is, a zinc solid-solve region was not formed, and zinc remained in the form of zinc oxide on the surface of the lithium-nickel-cobalt composite oxide powder. As a result the positive electrode active material obtained in Comparative Example 4 even before being exposed to the atmosphere exhibited a substantial increase in reaction resistance as compared with the reaction resistance of the positive electrode active materials obtained in Examples 1 to 11.

In Comparative Example 5, because the heat treatment time was prolonged, thermal diffusion of zinc into the lithium-nickel-cobalt composite oxide crystal increased to thereby result in substantially uniform diffusion of zinc throughout the lithium-nickel-cobalt composite oxide powder. As such, a zinc solid-solved region was not formed on the surface of the lithium-nickel-cobalt-zinc composite oxide powder. Because a zinc solid-solved region was not formed, the obtained positive electrode active material that was exposed to the atmosphere was unable to adequately prevent atmospheric degradation and exhibited a decrease in discharge capacity and a substantial increase in reaction resistance.

As can be appreciated from the above results, a positive electrode active material according to the present invention that includes a lithium-nickel-cobalt-zinc composite oxide powder having a zinc solid-solved region formed on at least a part of its surface can bring about effects of preventing a decrease in discharge capacity and preventing an increase in reaction resistance, and such a positive electrode active material has substantial utility as a positive electrode active material of a nonaqueous electrolyte secondary battery.

Although a positive electrode active material for a nonaqueous electrolyte secondary battery and a method for producing a positive electrode active material for a nonaqueous electrolyte secondary battery have been described above with reference to embodiments and examples, the present invention is not limited to the above embodiments and examples. That is, various modifications and changes may be made within the scope of the present invention as described in the claims.

The present application is based on Japanese Patent Application No. 2016-156064 filed on Aug. 9, 2016 and Japanese Patent Application No. 2016-201324 filed on Oct. 12, 2016, the entire contents of which are herein incorporated by reference.

DESCRIPTION OF THE REFERENCE NUMERALS 1 negative electrode
2 separator
3 positive electrode
4 gasket
5 negative electrode can
6 positive electrode can
7 current collector

The invention claimed is:

1. A positive electrode active material for a nonaqueous electrolyte secondary battery, the positive electrode active material comprising:
   a lithium-nickel-cobalt-zinc composite oxide powder that contains lithium (Li); nickel (Ni); cobalt (Co); element M, which is at least one element selected from the group consisting of manganese (Mn), vanadium (V), magnesium (Mg), molybdenum (Mo), niobium (Nb), silicon (Si), titanium (Ti), and aluminum (Al); and zinc (Zn),
   wherein a molar element ratio (Li:Ni:Co:M) of the lithium-nickel-cobalt-zinc composite oxide powder satisfies Li:Ni:Co:M=z:(1-x-y):x:y (where $0.95 \leq z \leq 1.10$, $0.05 \leq x \leq 0.35$, and $0 \leq y \leq 0.10$),
   wherein a zinc content with respect to Li, Ni, Co, the element M, and oxygen in the lithium-nickel-cobalt-zinc composite oxide powder is greater than or equal to 0.01 mass % and less than or equal to 1.5 mass %,
   wherein at least a part of a surface of the lithium-nickel-cobalt-zinc composite oxide powder includes a zinc solid-solved region where zinc is solid-solved and is unevenly distributed, and
   wherein the surface of the lithium-nickel-cobalt-zinc composite oxide powder is free of zinc oxide.

2. The positive electrode active material for a nonaqueous electrolyte secondary battery according to claim 1, wherein when the positive electrode active material is dispersed in water at 5 mass % to form a suspension, a pH of the suspension is less than or equal to 11.8.

3. The positive electrode active material for a nonaqueous electrolyte secondary battery according to claim 1. wherein a thickness of the zinc solid-solved region is greater than or equal to 10 nm and less than or equal to 100 nm.

4. A method for producing the positive electrode active material for a nonaqueous electrolyte secondary battery according to claim 1, the method comprising:
   coating a surface of a lithium-nickel-cobalt composite oxide powder with a compound containing zinc, wherein the lithium-nickel-cobalt composite oxide powder contains lithium (Li); nickel (Ni); cobalt (Co); and element M, which is at least one element selected from the group consisting of manganese (Mn), vanadium (V), magnesium (Mg), molybdenum (Mo), niobium (Nb), silicon (Si), titanium (Ti), and aluminum (Al); and a molar element ratio (Li:Ni:Co:M) of the lithium-nickel-cobalt composite oxide powder satisfies Li:Ni:Co:M=z:(1-x-y):x:y (where $0.95 \leq z \leq 1.10$, $0.05 \leq x \leq 0.35$, and $0 \leq y \leq 0.10$); and
   performing a heat treatment on the lithium-nickel-cobalt composite oxide powder that is coated with the compound containing zinc.

5. The method for producing the positive electrode active material for a nonaqueous electrolyte secondary battery according to claim 4, wherein
   the coating includes mixing together the lithium-nickel-cobalt composite oxide powder, pure water or an alkaline aqueous solution, and an aqueous solution containing zinc to coat the surface of the lithium-nickel-cobalt composite oxide powder with the compound containing zinc.

6. The method for producing the positive electrode active material for a nonaqueous electrolyte secondary battery according to claim 4, wherein the coating includes spraying an aqueous solution containing zinc onto the lithium-nickel-cobalt composite oxide powder to coat the surface of the lithium-nickel-cobalt composite oxide powder with the compound containing zinc.

7. The method for producing the positive electrode active material for a nonaqueous electrolyte secondary battery according to claim 4, wherein the coating includes mixing together the lithium-nickel-cobalt composite oxide powder and a powder of the compound containing zinc to coat the surface of the lithium nickel cobalt composite oxide powder with the compound containing zinc.

8. The method for producing the positive electrode active material for a nonaqueous electrolyte secondary battery according to claim 4, wherein the heat treatment is performed at a heat treatment temperature that is greater than or equal to 170° C. and less than or equal to 700° C.

9. The method for producing the positive electrode active material for a nonaqueous electrolyte secondary battery according to claim 4, wherein the heat treatment is performed for a heat treatment time that is greater than or equal to 1 hour and less than or equal to 10 hours.

10. The method for producing the positive electrode active material for a nonaqueous electrolyte secondary battery according to claim 4, the method further comprising:

drying the lithium-nickel-cobalt composite oxide powder coated with the compound containing zinc before performing the heat treatment.

\* \* \* \* \*